(12) United States Patent
Carli

(10) Patent No.: US 6,459,281 B1
(45) Date of Patent: Oct. 1, 2002

(54) HEAD FOR THE LINEAR DIMENSION CHECKING

(75) Inventor: Carlo Carli, Ferrara (IT)

(73) Assignee: Marposs Societa' per Azioni, Bentivoglio (IT)

( * ) Notice: Subject to any disclaimer, the term of this patent is extended or adjusted under 35 U.S.C. 154(b) by 0 days.

(21) Appl. No.: 09/647,345

(22) PCT Filed: Mar. 29, 1999

(86) PCT No.: PCT/EP99/02251

§ 371 (c)(1),
(2), (4) Date: Sep. 29, 2000

(87) PCT Pub. No.: WO99/51936

PCT Pub. Date: Oct. 14, 1999

(30) Foreign Application Priority Data

Apr. 6, 1998 (IT) .......................................... BO98A0217

(51) Int. Cl.⁷ ............................ G01R 27/08; G01B 7/28
(52) U.S. Cl. .................... 324/714; 324/158.1; 33/561
(58) Field of Search ................. 324/714, 716, 324/723, 158.1; 323/364; 33/501.4, 504, 544.3, 556, 559, 561

(56) References Cited

U.S. PATENT DOCUMENTS

| | | | | |
|---|---|---|---|---|
| 3,673,695 A | * | 7/1972 | Rethwish ...................... 33/561 |
| 3,678,485 A | | 7/1972 | Jones | |
| 4,568,876 A | * | 2/1986 | Maisch ........................ 324/714 |
| 5,049,827 A | * | 9/1991 | Tasma ......................... 324/723 |
| 5,079,500 A | * | 1/1992 | Oswald ........................ 323/364 |
| 5,111,592 A | * | 5/1992 | Aehnelt et al. ................ 33/504 |
| 5,200,747 A | * | 4/1993 | Betz et al. ................... 324/714 |
| 5,210,491 A | | 5/1993 | Hachtel et al. | |
| 5,343,142 A | * | 8/1994 | Sasaki et al. ................ 324/691 |
| 5,399,981 A | * | 3/1995 | Vermesse ..................... 324/714 |
| 5,435,072 A | * | 7/1995 | Lloyd et al. .................. 33/559 |
| 5,475,302 A | | 12/1995 | Mehnert et al. | |
| 5,669,152 A | * | 9/1997 | McMurtry .................... 33/558 |

FOREIGN PATENT DOCUMENTS

DE     214 434     10/1984

OTHER PUBLICATIONS

Patent Abstract of Japan, vol. 096, No. 009, Sep. 30, 1996, for JP 08 114410 A (Fuji Photo Optical Co., Ltd.) May 7, 1996.
Patent Abstract of Japan, vol. 018, No. 539 (P–1812), Oct. 13, 1994, for JP 06–194113 A (Nikon Corp.), Jul. 15, 1997.
Patent Abstracts of Japan, vol. 097, No. 011, Nov. 28, 1997, for JP 09–197461 A (Kyocera Corp.), Jul. 31, 1997.

* cited by examiner

*Primary Examiner*—Michael Sherry
*Assistant Examiner*—Minh N. Tang
(74) *Attorney, Agent, or Firm*—Dickstein Shapiro Morin & Oshinsky LLP

(57) ABSTRACT

A head for the linear dimension checking of pieces in machine tools or measuring machines with a support structure (1), a movable arm-set (4) including an arm (6) carrying a feeler (8) for contacting the piece (37) to be checked, a spring (17) arranged between the support structure and the movable arm-set, a first annular surface (19) fixed to the support structure, a second annular surface (18) fixed to the movable arm-set and urged by the spring into contact with the first annular surface and an electric detecting device. The detecting device includes a ring (16) made of electrically resistive material that defines the first annular surface and another ring (13) made of electrically resistive material that defines the second annular surface, a circuit (21) for applying a difference of potential across two points (22, 23) of the first ring and another circuit (30) for detecting the difference of potential across two points (24, 25) of the other ring.

17 Claims, 3 Drawing Sheets

HEAD FOR THE LINEAR DIMENSION CHECKING

TECHNICAL FIELD

The present invention relates to a head for the linear dimension checking of pieces in machine tools or measuring machines, with a support structure, a movable arm-set including an arm carrying a feeler for contacting the piece to be checked, a bias device arranged between the support structure and the movable arm-set, a constraining system arranged between the support structure and the movable arm-set including a first surface with rotational symmetry and a second surface with rotational symmetry, both these surfaces with rotational symmetry being urged to contact each other by the force provided by the bias device and an electric detecting device, arranged at said first surface with rotational symmetry and second surface with rotational symmetry, for providing a signal depending on the reciprocal position of the surfaces with rotational symmetry.

BACKGROUND ART

Heads or contact detecting, or "touch trigger", probes, with movable arm-sets that carry feelers, are used in coordinate measuring machines and machine tools, more particularly machining centres and turning machines, for checking machined or being machined pieces, tools, machine tables, etc. The checkings can regard, for example, the position or the geometric dimensions of the pieces. In each of these probes, contact between the feeler and, for example, a piece is monitored by suitable devices that detect specific displacements of the movable arm-set with respect to a support structure, and control the reading of transducers associated with the machine slides, that provide measurement values with respect to a reference position or origin.

The known heads of the type mentioned at the beginning of the description are described in DD-A-214434. In these heads the detecting device comprises a disk made of an electric conducting material to which there is coupled the arm carrying the feeler and that defines the second annular surface and at least a pair of elements, shaped in the form of portions of an annulus, also made of an electric conducting material. Both elements are arranged on the support structure at the first annular surface and are separated by portions made from insulating material. The detecting device detects the closure or opening status of a circuit in which, in the absence of forces acting on the feeler, the second annular surface and the two elements are electrically connected in series.

The movable arm-set can accomplish, subsequently to contact between the feeler and the piece to be checked and depending on the reciprocal displacement direction between the head and the piece, translation displacements along the longitudinal axis (Z) of the head and rotational displacements about a contact point between the two annular surfaces. Owing to the fact that usually the displacements of the movable arm-set are limited, upon the rotational displacements there occur, in substance, lateral displacements of the feeler (in the X-Y plane).

These known heads are subject to some drawbacks, for example due to the fact that the first annular surface is made of two different materials. This may cause, besides manufacturing complexity, an anisotropic behaviour of the head, more specifically as a consequence of different thermal expansions. On this regard, the concept of anisotropy substantially consists in the fact that, as the direction of the transversal displacement of the feeler changes, the triggering of the detecting device takes place at different eccentricity values of the feeler with respect to the longitudinal geometric axis of the head.

Other drawbacks that are due to the fact that the first annular surface is made of two different types of material can consist, for example, in the interruption—when the head is in the inoperative position—of the electric connection between the disk and the two elements made of electrically conducting material or the failure to interrupt the connection as a consequence of the feeler displacing along a transversal direction. Obviously, this latter error in the operation may also cause irrepairable damage to the head and, in general, serious problems insofar as safety is concerned, because the contact signal sent by the head is generally utilized for controlling the stopping of the displacements of the machine slides.

DISCLOSURE OF INVENTION

Object of the present invention is to provide a head with limited isotropy errors with respect to transversal displacements of the feeler, constructional simplicity and a highly reliable detecting device. This and other objects are provided by a head of the type hereinbefore described in which the detecting device includes a first electrically resistive portion arranged in the support structure and a second electrically resistive portion arranged in the movable arm-set, said first and second resistive portions being substantially electrically connected in parallel in the condition according to which said first and second surfaces with rotational symmetry are in abutment.

BRIEF DESCRIPTION OF THE DRAWINGS

The invention is now described in more detail with reference to the enclosed sheets of drawings, given by way of non limiting example. For the purposes of convenience of representation, the orientations of the drawings vary.

BEST MODE FOR CARRYING OUT THE INVENTION

Figure 1:
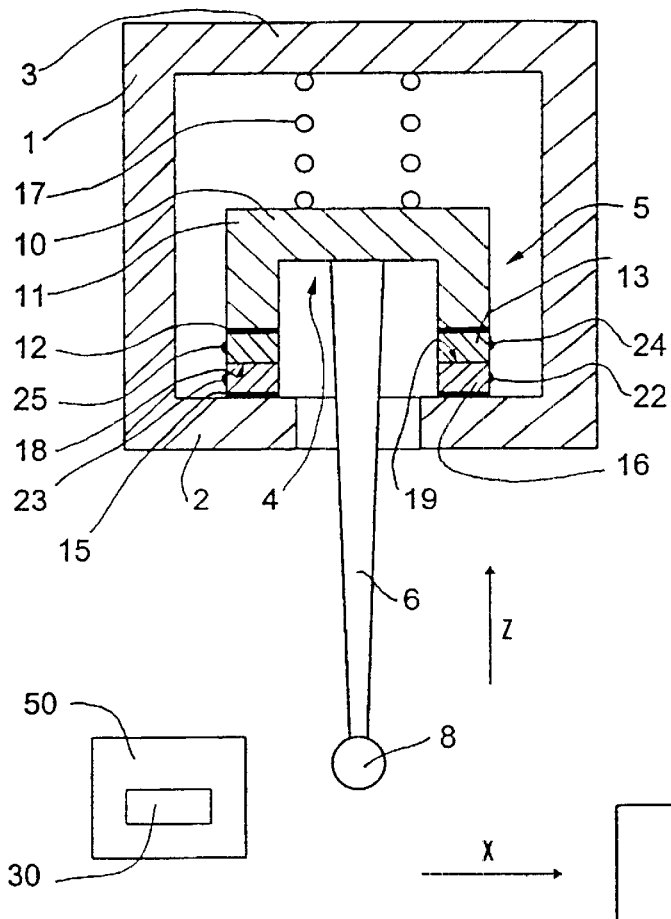
FIG. 1 is A very schematic longitudinal crosssectional view of a contact detecting head.

The head schematically illustrated in the figures includes a support and protection structure with a casing 1, that has a lower base 2 and an upper base 3. The casing 1 has a substantially cylindrical shape and defines a longitudinal geometric axis (axis Z in a Cartesian co-ordinate system).

A movable arm-set 4 is partially housed within casing 1 and includes a support element 5, an arm 6 coupled to the support element 5 and partially protruding from casing 1 through a hole of the lower base 2, and a feeler 8 fixed to a free end of arm 6. The support element 5 comprises an upper base 10, a cylindrical portion 11 ending with an annular end, a ring 12, made of electrically insulating material, fixed to the annular end, and another ring 13 made of electrically resistive material, fixed to ring 12.

A third ring 15, made of insulating material, is internally fixed to the lower base 2 of casing 1 and a fourth ring 16, made of electrically resistive material, is fixed on the third ring 15.

A bias device comprises a compression spring 17 arranged between the upper base 3 of casing 1 and support element 5, for urging the lower annular surface 18 of ring 13 into contact with the upper annular surface 19 of ring 16. When arm-set 4 is in rest condition, i.e., in the absence of forces acting on feeler 8, the constraining device including the lower annular surface 18 of ring 13 and the upper annular surface 19 of ring 16 is closed by the force provided by spring 17 and prevents displacements of movable arm-set 4 in connection with the translations along the longitudinal axis Z of the probe and displacements of rotation about the transversal axes X and Y.

The constraining system of the movable arm-set 4 comprises further constraining means for preventing translations of the movable arm-set along the transversal axes X and Y and displacements of rotation about the longitudinal axis Z. For the sake of simplicity, the further constraining means are not shown in the drawings, also in consideration of the fact that their specific structure does not regard this invention. They can be made in different ways, for example, by employing the flat spring with a membrane shape shown in the formerly mentioned patent DD-A-214434.

A sealing and protection gasket, also not shown in the drawings, for the sake of simplicity, is fixed between arm 6 and the lower base 2 of casing 1.

Figure 2:
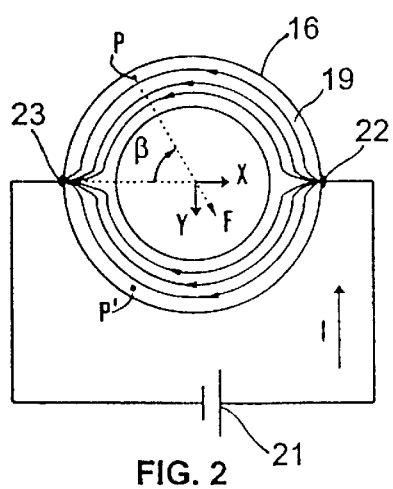
FIGS. 2 and 3 refer to a detecting device of the head of FIG. 1.
Figure 3:
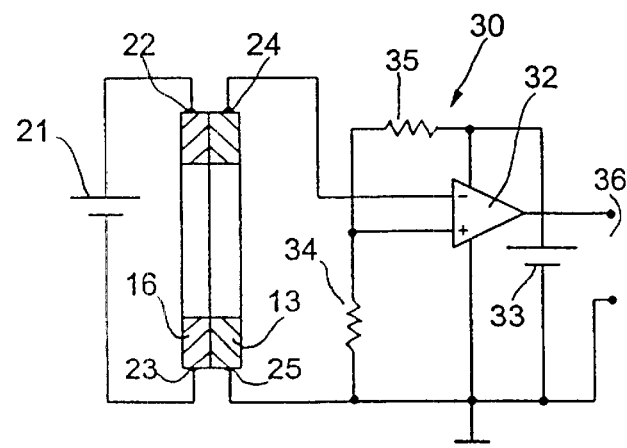

With reference to FIGS. 2 and 3, an electric detecting device comprises a generator, or direct current source 21, which applies a difference of electric potential between two contacts 22 and 23, connected to diametrically opposite points of ring 16, and a detecting circuit 30 which receives the voltage existing between two contacts 24 and 25 connected with diametrically opposite points of ring 13 located (in the condition of FIGS. 1 and 3) on the same meridian plane containing the points connected with contacts 22 and 23.

Detecting circuit 30 comprises a comparator 32, fed by a voltage source 33 and having the inverting input connected with contact 24 and the non-inverting input connected with contact 25, through a resistor 34 of a voltage divider including another resistor 35.

Annular surfaces 18 and 19 are accurately lapped so as to approach the theoretical condition of mutual contact on their whole facing areas when feeler 8 is not subject to forces.

In this condition, electric current flows through ring 13 and has a path similar to that of current I that flows through ring 16, as illustrated in FIG. 2. A difference of potential (lower than that present across contacts 22 and 23, but in any case sufficient for the purposes described below) is present across contacts 24 and 25.

In substance, it can be said that, from an electrical point of view, rings 13 and 16 are "substantially" in parallel. On this regard, it can be commented that, since the contact is distributed, the wording "in parallel" would not be totally proper.

Due to the mutual approach between the head and a piece 37 along the axis Z and the contact of feeler 8 against piece 37, movable arm-set 4 can translate, against the bias provided by spring 17, and ring 13 totally detaches from ring 16, so that the difference of potential across contacts 24 and 25 becomes equal to zero.

In the case of mutual approach and contact between feeler 8 and piece 37 along a transversal direction, for example along the direction X, as shown in FIG. 1, movable arm-set 4 tilts on a point of surface 19 and in this case too, the current flow through ring 13 ceases and the difference of potential across contacts 24 and 25 becomes equal to zero.

Comparator 32 compares a threshold value defined by voltage divider 34, 35, fed by voltage source 33, with the difference of potential across contacts 24 and 25. When arm 6 is not deflected, the signal at output 36 of comparator 32 is at low level, while when arm 6 is deflected the signal at output 36 is at high level.

An inconvenience, that the detection circuit 30 shown in FIG. 3 causes, consists in the requirement of two voltage sources 21 and 33 with galvanic insulation between each other.

Figure 4:
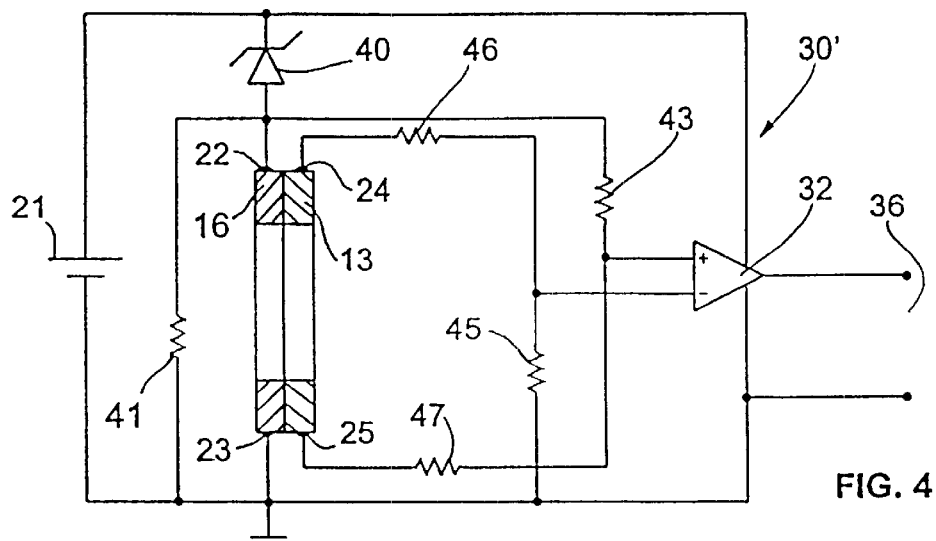
FIG. 4 shows an alternative detecting circuit with respect to the one of FIG. 3.

An alternative circuit 30' for obviating this inconvenience is shown in FIG. 4.

Voltage source 21 directly feeds comparator 32 and, by means of a Zener diode 40, ring 16 across contacts 22 and 23. A resistor 41 is connected between contacts 22 and 23.

A resistor 43 is connected between contact 22 and the non-inverting input of comparator 32, while a resistor 45 is connected between contact 23 and the inverting input of comparator 32. A resistor 46 is connected between contact 24 and the inverting input of comparator 32, while a resistor 47 is connected between contact 25 and the non-inverting input of comparator 32. Resistors 43 and 45 and, respectively, 46 and 47 have resistances of identical value.

Depending on the type of application, the head can be connected with a power supply, display and control unit 50 by means of a cable or wireless (optoelectronic, inductive or radio-frequency) transmission devices. Also depending on the type of application, generator 21 and detection circuit 30 or 30' can be arranged on the head or at its exterior.

The detecting device provides excellent security in the event that there is a lack of power supply voltage at contacts 22 and 23 or there occurs an interruption in the connection between contacts 24 and 25 and detection circuit 30 or 30'. In these cases the voltage applied at the input of the detection circuit 30 or 30' is equal to zero and this corresponds to the condition of displacement of feeler 8 even if in actual fact it has not undergone any displacement, thus this anomalous condition enables to detect the malfunction.

Furthermore, the detecting device enables to determine the direction of displacement of feeler 8.

By taking into consideration FIGS. 1 and 2 and assuming that the movable arm-set does not undergo any translations along the longitudinal axis Z, it is understood that the straight line joining point P for the rotation of the annular surface 18 on the annular surface 19 and the center of the annular surface 19 has the same direction as that of the displacement F of feeler 8, hence the angle β shown in FIG. 2 is identical to the angle formed between the direction of displacement F of feeler 8 and axis X.

The common potential of contacts 24 and 25 is identical to the potential of point P. In turn, the difference of potential between point P and contact 23 is proportional to the angle β, when the values of the latter are between 0° and 180°.

However, it should be realized that in this way angle P is not univocally defined, because if the rotation point were P', (simmetric to P with respect to the straight line passing through contacts 22 and 23) the difference of potential would be the same.

Figure 5:
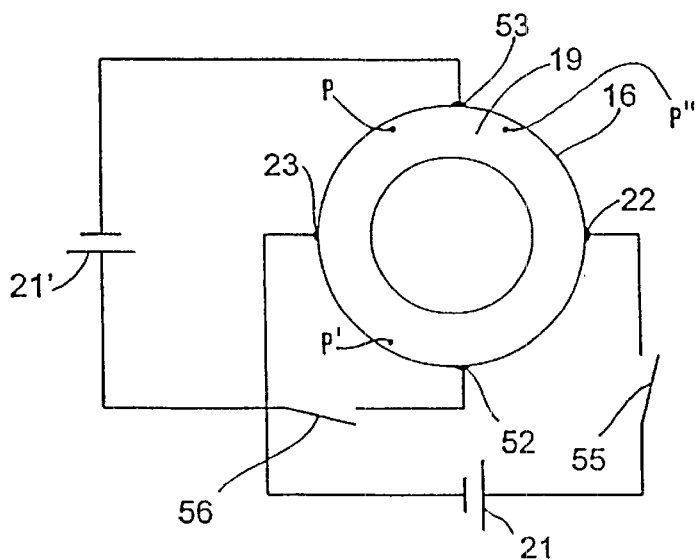
FIG. 5 has the purpose of clarifying the functioning principle of a detecting device that enables to determine even the displacement direction of the feeler of the probe shown in FIG. 1.

In any case, it is possible to obviate the inconvenience by implementing a method and a device substantially based on the functioning principle shown in FIG. 5. Two identical voltage generators 21 and 21' can be connected with contacts 22 and 23, respectively, and with other two contacts 52 and 53, by means of switches 55 and 56. Contacts 52 and 53 are connected with diametrically opposite points of ring 16 lying in a straight line that is coplanar and perpendicular to the straight line passing through the points connected with contacts 22 and 23.

By keeping switch 55 closed and switch 56 open and measuring the difference of potential between ring 13 and contact 23, it is possible to determine that the direction of displacement of feeler 8 is one of the two defined by the center of the annular surface 19 and point P or point P'.

Subsequently, by keeping switch 55 open and switch 56 closed and measuring the difference of potential between ring 13 and contact 53, it is possible to determine that the direction of displacement is one of the two defined by the center of the annular surface 19 and point P or point P'' (P'' is symmetric to P with respect to the straight line passing through contacts 52 and 53).

Thus, it is possible to deduce that, in this case, the direction of displacement is the one defined by the center of the surface 19 and the point of contact P.

Figure 7:
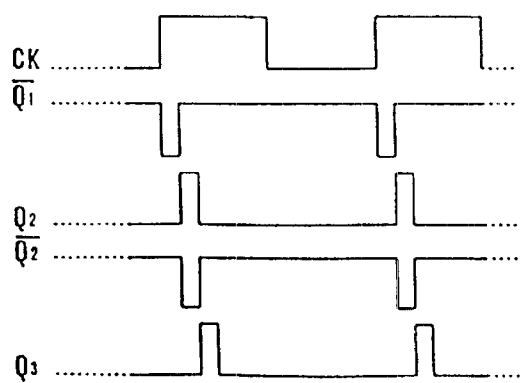
FIG. 7 shows time charts of some of the signals of the circuit of FIG. 6.
Figure 6:
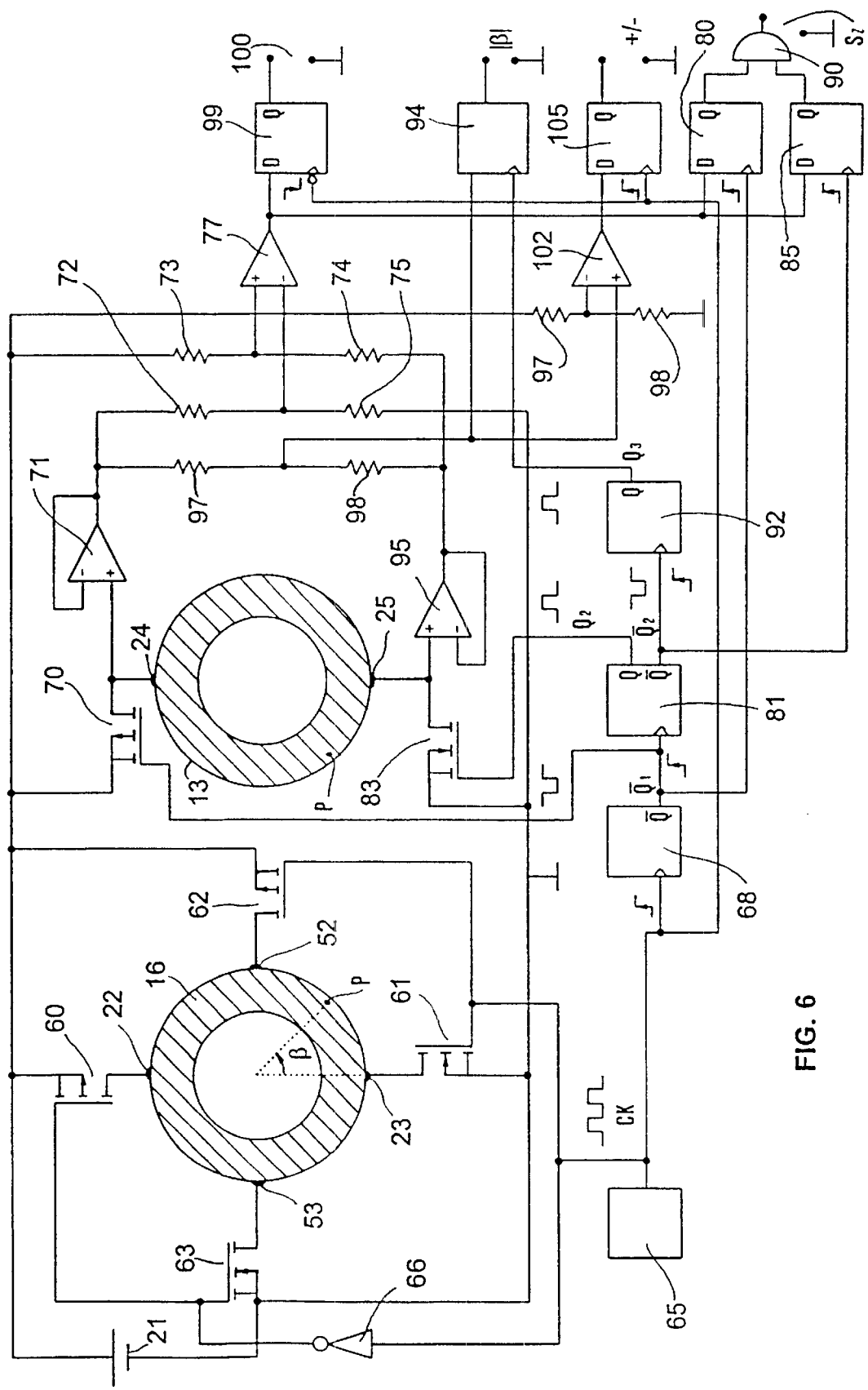
FIG. 6 is a possible circuit diagram relating to FIG. 5.

With reference to FIGS. 6 and 7, there is now described a detecting device that enables to detect, in addition to the occurring of the displacement of feeler 8, whether the displacement occurs along the longitudinal axis Z or (according to the previously mentioned terminology) in the transversal plane X-Y, likewise determining, in this latter case, even the displacement direction.

The diagram shown in FIG. 6 has some practical differences with respect to FIG. 5, for example, it foresees a single voltage source 21.

Voltage source 21 is alternatively connected with contacts 22, 23 and 52, 53, respectively, by means of Field Effect Transistors ("FET") 60, 61, 62 and 63, controlled by a square wave oscillator 65 that provides a synchronism signal CK.

Transistors 60–63 are all of the MOS ("Metal Oxide Semiconductor") enhancement mode type, and among them transistors 60 and 62 are P-channel type and transistors 61 and 63 N-channel type.

An inverter 66 is connected between oscillator 65 and the gates of transistors 60 and 63.

When the signal CK is at high level, transistors 60 and 61 conduct and transistors 62 and 63 do not conduct.

At the upward front of signal CK a monostable multivibrator 68 provides at its output $\overline{Q}$ a low level pulse that causes the conducting of another transistor 70, of MOSFET enhancement mode P-channel type, connected between the voltage source 21 and the non-inverting input of an operational amplifier 71, in turn connected with contact 24 (the other transistor 83, of MOSFTT N-channel type, hereinafter described, is in the meantime held off). Thus, contact 24 is connected with the positive pole of source 21. Under these conditions, if feeler 8 has displaced in the plane X-Y, rings 13 and 16 touch at a single point P and, unless point P is very close to contact 24, between contacts 24 and 25 there is a certain difference of potential that is detected (even by means of another operational amplifier 95, hereinafter described) by the circuit comprising resistors 72, 73, 74 and 75 and comparator 77 (that corresponds to comparator 32 in FIG. 4). Resistors 72 and 74 and 73 and 75, respectively, have resistances with identical value. If the voltage between contacts 24 and 25 is greater than the threshold defined by resistors 72–75, comparator 77 provides a low level output. At the end of the low level pulse provided by multivibrator 68, in correspondence with the upward front, the state of the output of comparator 77 is memorized by a bistable ("Flip Flop") multivibrator 80.

Starting from the upward front of the signal provided by monostable multivibrator 68, another monostable multivibrator 81 provides, at its output Q, a high level pulse that makes a transistor 83 of MOSFET enhancement mode N-channel type conduct (transistor 70 is open). Thus, contact 25 is connected with the negative pole of source 21. In these conditions, if feeler 8 has displaced in the plane X-Y, rings 13 and 16 touch at a point P only and, unless point P is quite near contact 25, between contacts 24 and 25 there is a certain difference of potential that is detected by the circuit comprising resistors 72, 73, 74 and 75 and comparator 77, that provides at its output a low level signal. At the end of the high level pulse provided by output Q of multivibrator 81, in correspondence with the downward front, the state of the output of comparator 77 is memorized by a bistable ("Flip Flop") multivibrator 85.

The outputs Q of the bistable multivibrators 80 and 85 are connected with associated inputs of a logic product circuit ("and") 90. If the displacement of feeler 8 has occurred in the plane X-Y, at least one of bistable multivibrators 80 and 85 provides at its output Q a low level and hence the logic product circuit 90 keeps the output signal $S_z$ low. If, on the contrary, feeler 8 has undergone a translation displacement along axis Z, further to which there remains no contact point between rings 13 and 16, there is no difference of potential across contacts 24 and 25, the outputs Q of multivibrators 80 and 85 are both at high level and therefore even signal $S_z$ is at high level. In this way, signal $S_z$ indicates whether the displacement of feeler 8 has occurred in the form of a translation along axis Z or in the plane X-Y.

Once the pulse provided by monostable multivibrator 81 ends, transistors 70 and 83 are both held off and the synchronism signal CK is still high (FIG. 7); if the displacement of feeler 8 has occurred in the plane X-Y, the two rings 13 and 16 touch at a point P only.

The potential common to contacts 24 and 25 coincides with the potential of point P. The potential of point P with respect to ground—that corresponds to the difference of potential between point P and contact 23—is proportional to the absolute value of the angle β when the values of the latter are in the range from −180° to +180°.

At the end of the high level pulse provided by output Q of the monostable multivibrator 81, starting from the downward front, another monostable multivibrator 92 provides at its output Q a high level pulse that causes the gaining of the potential common to contacts 24 and 25 by a sample/hold circuit 94 and its holding at the analog output|β| for all the remaining cycle time.

The formerly mentioned operational amplifier 95 has its non-inverting input connected with contact 25 and the output connected with the output of the operational amplifier 71 by means of two resistors 97 and 98, that have identical resistance values, and with the non-inverting input of comparator 77 by means of resistor 74. The operational amplifiers 71 and 95, with unitary gain, avoid that the load formed by resistors 72–75, 97 and 98 alters the potential to be measured.

At the downward front of the synchronism signal CK, a bistable multivibrator 99 gains the signal provided by comparator 77 and keeps it at output 100 for all the remaining cycle time. The operation of the circuit including resistors 72–75 and comparator 77 is identical to that of the circuit of FIG. 4.

When the synchronism signal CK is at low level, transistors 62 and 63 conduct, while transistors 60 and 61 are held off. If it is assumed that the displacement of feeler 8 occurs in the plane X-Y, the potential of point P is greater or less than half of the power supply voltage of source 21 depending on whether angle β is positive or negative, respectively (angle β in FIG. 6 is considered to be positive). A comparator 102 carries out the comparison between the potential of point P and half the power supply voltage provided by the divider including resistors 97 and 98 and the value of its output is gained by a bistable multivibrator 105 at the upward fronts of the synchronism signal CK. The level of the output signal of bistable multivibrator 105 is high when angle β is positive, low in the opposite case.

Obviously, when arm 6 is in an inoperative position, or has undergone a translation along axis Z, the output signals of the sample/hold circuit 94 and bistable multivibrator 105 have no meaning.

FIG. 7 shows the time charts of the following signals: the synchronism signal CK generated by oscillator 65; the $\overline{Q_1}$ signal at output $\overline{Q}$ of monostable multivibrator 68; the signal $Q_2$ at output Q of monostable multivibrator 81; the signal $\overline{Q_2}$ at output $\overline{Q}$ of monostable multivibrator 81; and the signal $Q_3$ at output Q of monostable multivibrator 92. Preferably, rings 12 and 15 are made of alumin a ($Al_2O_3$) rings 13 and 16 are made of a bond of titanium oxide and alumina and the remaining part of movable arm-set 4 is made of steel.

The coupling of rings 12 and 15 to movable arm-set 4 and base 2, respectively, and that of rings 13 and 16 to ring 12 and ring 15, respectively, can be achieved by means of a glueing process. In any case, rings 12, 13, 15 and 16 can be achieved in other ways, for example, insofar as rings 13 and 16 are concerned, by means of a galvanic or hot deposition.

It is also possible to manufacture movable arm-set 4 from an electric non conducting material, for example, a ceramic material, by glueing or hot depositing ring 13, made of an electrically resistive material. Thus ring 12 made of insulating material is not anymore necessary.

By way of indicative purposes only, the voltage provided by generator 21 is in the range from 3 to 30 V and the electric resistance across contacts 22 and 23 is between 1 kΩ and 100 kΩ. The electric resistance across contacts 24 and 25 can be between the same values of 1 kΩ and 100 kΩ, but can differ from that across contacts 22 and 23.

In to reduce possible anisotropic behaviour of the head, it is suitable that the width of the annulus corresponding to annular surface 19 and/or of the annulus corresponding to annular surface 18 be sensibly lower than the inner radius of the associated annulus.

On this regard, it is pointed out that the dimensions in the figures should not be considered significant. Accordingly, with reference to the orientation of the head of FIG. 1, ring 13 can have a downward tapered shape and/or ring 16 an upward tapered shape, so that contact between the two rings 13 and 16 substantially occurs at a pre-set circumference.

Although the embodiments shown in the drawings and formerly described include elements made of resistive material that define plane annular surfaces (in the shape of annuli) urged into reciprocal contact, the invention can also foresee the use of elements made of resistive material that define non-plane surfaces with rotational symmetry.

For example, the invention can apply to a probe with a constraining system including an element with a spherical-segment shape and an element with an internal surface with a truncated cone shape, provided that the head be made in such a way so that the displacement of the feeler causes in any case the total detachment of the two surfaces, or the maintaining of contact substantially in a point.

Even in the above case, when the feeler is not subject to forces, contact occurs between two elements made of resistive material substantially along a contact circumference, while as a consequence of the applying of a force and the displacing of the feeler, contact is removed or substantially kept in a point.

Other variants, of both electric and mechanic nature may be introduced with respect to what has been herein described and illustrated, without departing from the scope of the invention.

The development of cylindrical portion 11 along longitudinal axis Z can have other values, and indeed said portion 11 can be eliminated, but preferably the centre of gravity of movable arm-set 4 must lie in the plane corresponding to the zone of contact between annular surfaces 18 and 19.

The connection of voltage source 21 can be achieved by utilizing movable ring 13, and in this case detection circuit 30 is connected to stationary ring 16.

The displacement of the feeler can be detected on the basis of variations of the load ohmic resistance at voltage source 21, rather than on the basis of variations of differences of potential. In fact, this ohmic resistance increases when annular surfaces 18 and 19 detach, totally (translation of the movable arm-set 4 along axis Z) or partially (transversal displacements of feeler 8).

Furthermore, it is possible to utilize, instead of a direct voltage source 21, one or more alternating voltage sources, by featuring appropriate modifications in the detection circuit 30. In this case, the detecting of the displacements of feeler 8 does not involve significant problems, while the determining of the direction of displacement of the feeler involves more substantial modifications and circuit complications, without offering particular advantages.

What is claimed is:

1. A head for the linear dimension checking of pieces in machine tools or measuring machines, comprising:
    a support structure;
    a movable arm-set including an arm carrying a feeler for contacting the piece to be checked;
    a bias device arranged between the support structure and the movable arm-set;
    a constraining system arranged between the support structure and the movable arm-set and including a first surface with rotational symmetry and a second surface with rotational symmetry, both these surfaces with rotational symmetry being urged to contact each other by a force provided by the bias device; and
    an electric detecting device, for providing a signal depending on the reciprocal position of the first and second surfaces with rotational symmetry, including a first electrically resistive portion arranged in the support structure and a second electrically resistive portion arranged in the movable arm-set, wherein said first and second resistive portions define said first and second surfaces with rotational symmetry and are substantially electrically connected in parallel in the condition according to which said first and second surfaces with rotational symmetry are in abutment.

2. The head according to claim 1, wherein said first and second surfaces with rotational symmetry substantially define associated annuli.

3. The head according to claim 1, wherein said detecting device provides a signal that depends on a difference of potential across at least two points of one of said electrically resistive portions.

4. The head according to claim 3, wherein said electrically resistive portions are electrically insulated with respect to the remaining portions of the support structure and the movable arm-set, the detecting device including a voltage source connected with one of said electrically resistive portions, and a detecting circuit connected with the other of said electrically resistive portions.

5. The head according to claim 4, wherein said voltage source provides a direct voltage.

6. The head according to claim 4, wherein said detecting device determines the direction of the transversal displacements of said feeler as a consequence of contact with the piece.

7. The head according to claim 4, wherein said detecting device determines whether said movable arm-set displaces in an axial direction as a consequence of contact between the feeler and the piece.

8. The head according to claim 4, wherein said detecting device provides a first signal for detecting the partial or total detaching of said surfaces with rotational symmetry, a second signal for detecting axial displacements of said movable arm-set, a third signal indicative of the module of the angle between the direction of displacement of the feeler and a transversal axis and a fourth signal indicative of the sign of said angle.

9. The head according to claim 5, wherein said detecting device determines the direction of displacement of said arm as a consequence of contact between the feeler and the piece, on the basis of the electrical potential of said electrically resistive portion connected with said detecting circuit.

10. The head according to claim 8, wherein said voltage source can alternatively be connected with associated points of said one of the electrically resistive potions.

11. The head according to claim 10, wherein said detecting circuit determines the direction of displacement of said movable arm-set and arm on the basis of the value of the electric potential of said electrically resistive portion connected with the detection circuit in the two conditions in which said voltage source is alternatively connected with associated points of said one of the electrically resistive portions.

12. The head according to claim 1, wherein said electrically resistive portions have a substantially annular shape and are fixed to the movable arm-set and the support structure, respectively, by means of electrically insulating connecting portions.

13. The head according to claim 12, wherein said electrically resistive portions are made of an alumina and titanium oxide bond.

14. The head according to claim 12, wherein said electrically insulating connecting portions are made of alumina.

15. The head according to claims 4, wherein said source provides a voltage in the range from 3 to 30 V.

16. The head according to claim 4, wherein there is an electric resistance in the range from 1 k$\Omega$ to 100 k$\Omega$ across said two points of one of said electrically resistive portions.

17. The head according to claim 1, wherein each of said electrically resistive portions has an electric resistance in the range from 1 k$\Omega$ to 100 k$\Omega$.

* * * * *

UNITED STATES PATENT AND TRADEMARK OFFICE
CERTIFICATE OF CORRECTION

PATENT NO.    : 6,459,281 B1
DATED         : October 1, 2002
INVENTOR(S)   : Carlo Carli It is certified that error appears in the above-identified patent and that said Letters Patent is hereby corrected as shown below:

Column 2,
Line 5, under the heading "BRIEF DESCRIPTION OF THE DRAWINGS,"
"FIG. 1 is A" should be changed to -- FIG. 1 is a --; and Column 7,
Line 25, "alumin a $(Al_2O_2)$" should be changed to -- alumina $(Al_2O_3)$ --.

Signed and Sealed this

Fourth Day of March, 2003

JAMES E. ROGAN
*Director of the United States Patent and Trademark Office*